United States Patent
McGee

(10) Patent No.: US 6,371,077 B1
(45) Date of Patent: Apr. 16, 2002

(54) WAVEFORM TRANSITIONING METHOD AND APPARATUS FOR MULTI-SHOT FUEL SYSTEMS

(75) Inventor: Brian G. McGee, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/616,101

(22) Filed: Jul. 13, 2000

(51) Int. Cl.⁷ .............................. F02B 3/12; F02D 41/40

(52) U.S. Cl. ...................................... 123/299; 123/446

(58) Field of Search .................................. 123/299, 300, 123/490, 446, 492, 493

(56) References Cited

U.S. PATENT DOCUMENTS

| | | |
|---|---|---|
| 4,571,683 A | 2/1986 | Kobayashi et al. |
| 4,576,135 A | 3/1986 | Johnson |
| 4,621,599 A | 11/1986 | Igashira et al. |
| 4,704,999 A | 11/1987 | Hashikawa et al. |
| 4,729,056 A | 3/1988 | Edwards et al. |
| 4,836,161 A | 6/1989 | Abthoff et al. |
| 4,922,878 A | 5/1990 | Shinogle et al. |
| 5,020,979 A | 6/1991 | Askew |
| 5,070,836 A | 12/1991 | Wahl et al. |
| 5,113,833 A | 5/1992 | Nagano et al. |
| 5,245,972 A | 9/1993 | Denz et al. |
| 5,267,545 A | 12/1993 | Kitson |
| 5,268,842 A | 12/1993 | Martson et al. |
| 5,277,164 A | 1/1994 | Takahashi et al. |
| 5,320,079 A | 6/1994 | Kuwabara |
| 5,379,733 A | 1/1995 | Haddick et al. |
| 5,427,072 A | 6/1995 | Udo |
| 5,427,083 A | 6/1995 | Ahern |
| 5,450,829 A | 9/1995 | Beck |
| 5,460,128 A | 10/1995 | Kruse |
| 5,492,098 A | 2/1996 | Hafner et al. |
| 5,499,608 A | 3/1996 | Meister et al. |
| 5,507,260 A | 4/1996 | Hintzen |
| 5,540,205 A | 7/1996 | Davis et al. |
| 5,549,092 A | 8/1996 | Hasegawa et al. |
| 5,566,650 A | 10/1996 | Kruse |
| 5,566,660 A | 10/1996 | Camplin et al. |
| 5,588,415 A | 12/1996 | Ahern |
| 5,609,131 A | 3/1997 | Gray, Jr. et al. |
| 5,634,448 A | 6/1997 | Shinogle et al. |
| 5,647,317 A | 7/1997 | Weisman, II et al. |
| 5,678,521 A | 10/1997 | Thompson et al. |
| 5,685,273 A | 11/1997 | Johnson et al. |
| 5,701,870 A | 12/1997 | Gottshall et al. |
| 5,704,336 A | 1/1998 | Wrobel |
| 5,722,373 A | 3/1998 | Paul et al. |
| 5,732,680 A | 3/1998 | Ninomiya et al. |
| 5,740,775 A | 4/1998 | Suzuki et al. |
| 5,740,776 A | 4/1998 | Enderle et al. |

(List continued on next page.)

FOREIGN PATENT DOCUMENTS

EP         0 221 832 A2         5/1987

OTHER PUBLICATIONS

SAE 2/24–27, 1997 A New Concept for Low Emission Diesel Combusion—Printed from Diesel Engine Combustion Processes and Emission Control Technologies (SP–1246).

Primary Examiner—Tony M. Argenbright

(57) ABSTRACT

A fuel injection control system and method for delivering multiple fuel injections to a cylinder of an engine during a fuel injection event based upon engine operating conditions, the control system including an electronic controller coupled to an electronically controlled fuel injector, and a plurality of sensors coupled to the controller for inputting certain signals representative of certain engine operating conditions, the controller being operable to output a fuel injection signal to the fuel injector to deliver multiple fuel shots to the cylinder during a fuel injection event based upon the sensor signals. The controller also determines when an active fuel injection waveform should transition to another waveform based on fuel and engine speed changes.

24 Claims, 6 Drawing Sheets

U.S. PATENT DOCUMENTS

| | | |
|---|---|---|
| 5,746,183 A | 5/1998 | Parke et al. |
| 5,778,850 A | 7/1998 | Buratti et al. |
| 5,794,585 A | 8/1998 | Yonezawa et al. |
| 5,803,049 A | 9/1998 | Harcombe |
| 5,832,901 A | 11/1998 | Yoshida et al. |
| 5,839,275 A | 11/1998 | Hirota et al. |
| 5,865,153 A | 2/1999 | Matsumoto |
| 5,865,158 A | 2/1999 | Cleveland et al. |
| 5,893,347 A | 4/1999 | McGee et al. |
| 5,924,403 A * | 7/1999 | Thomas ................... 123/300 |
| 5,979,398 A | 11/1999 | Yanagihara |
| 5,979,412 A | 11/1999 | Werner |
| 5,986,871 A | 11/1999 | Forck et al. |
| 6,000,384 A | 12/1999 | Brown et al. |
| 6,006,727 A | 12/1999 | Katashiba et al. |
| 6,009,849 A | 1/2000 | Yamamoto et al. |
| 6,014,956 A | 1/2000 | Cowden et al. |
| 6,021,370 A | 2/2000 | Bellinger et al. |
| 6,026,780 A * | 2/2000 | Barnes et al. ................ 123/299 |
| 6,032,637 A * | 3/2000 | Mamiya et al. .......... 123/299 X |
| 6,032,642 A | 3/2000 | Trumbower et al. |
| 6,044,824 A | 4/2000 | Mamiya et al. |

* cited by examiner

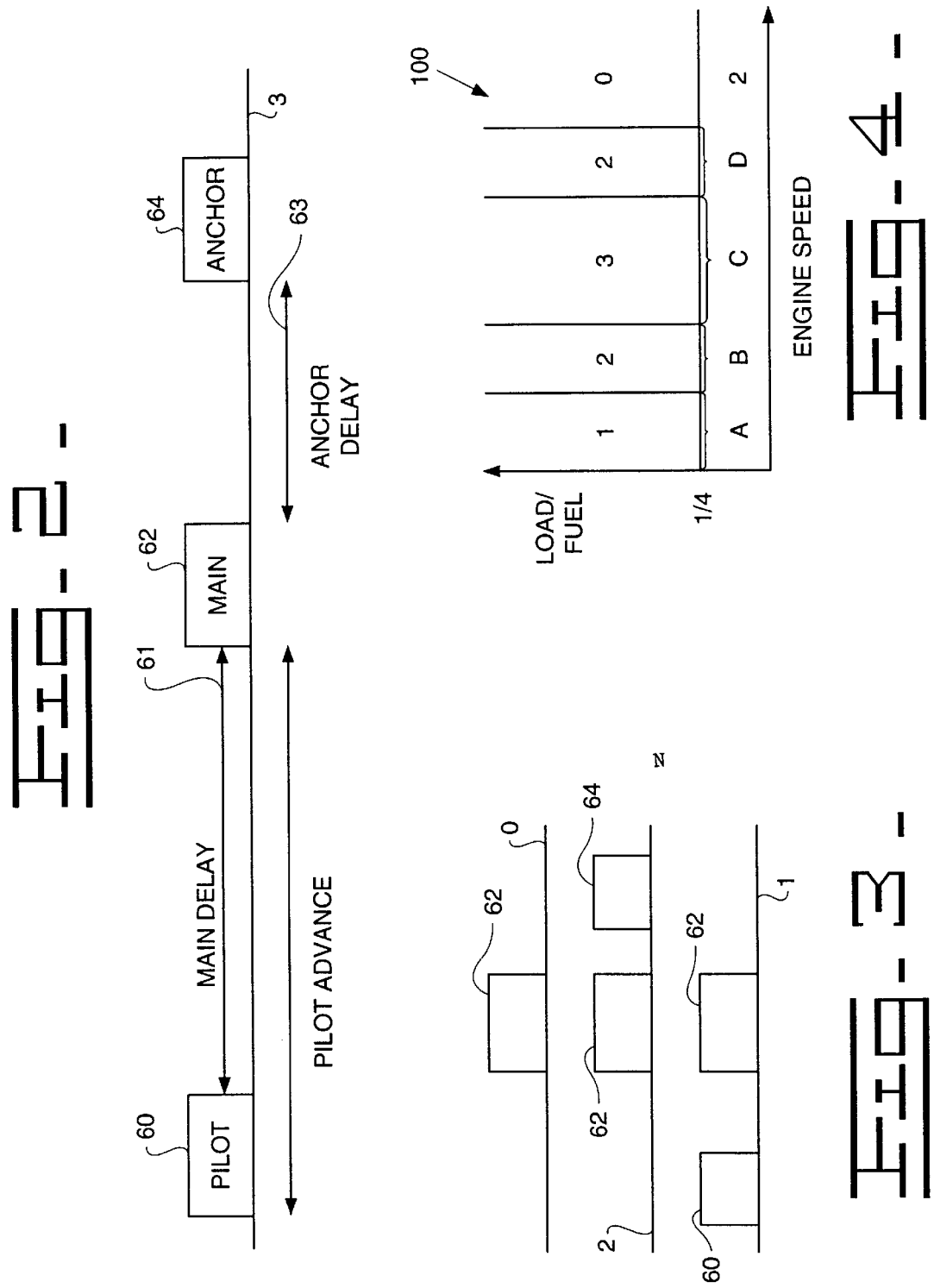

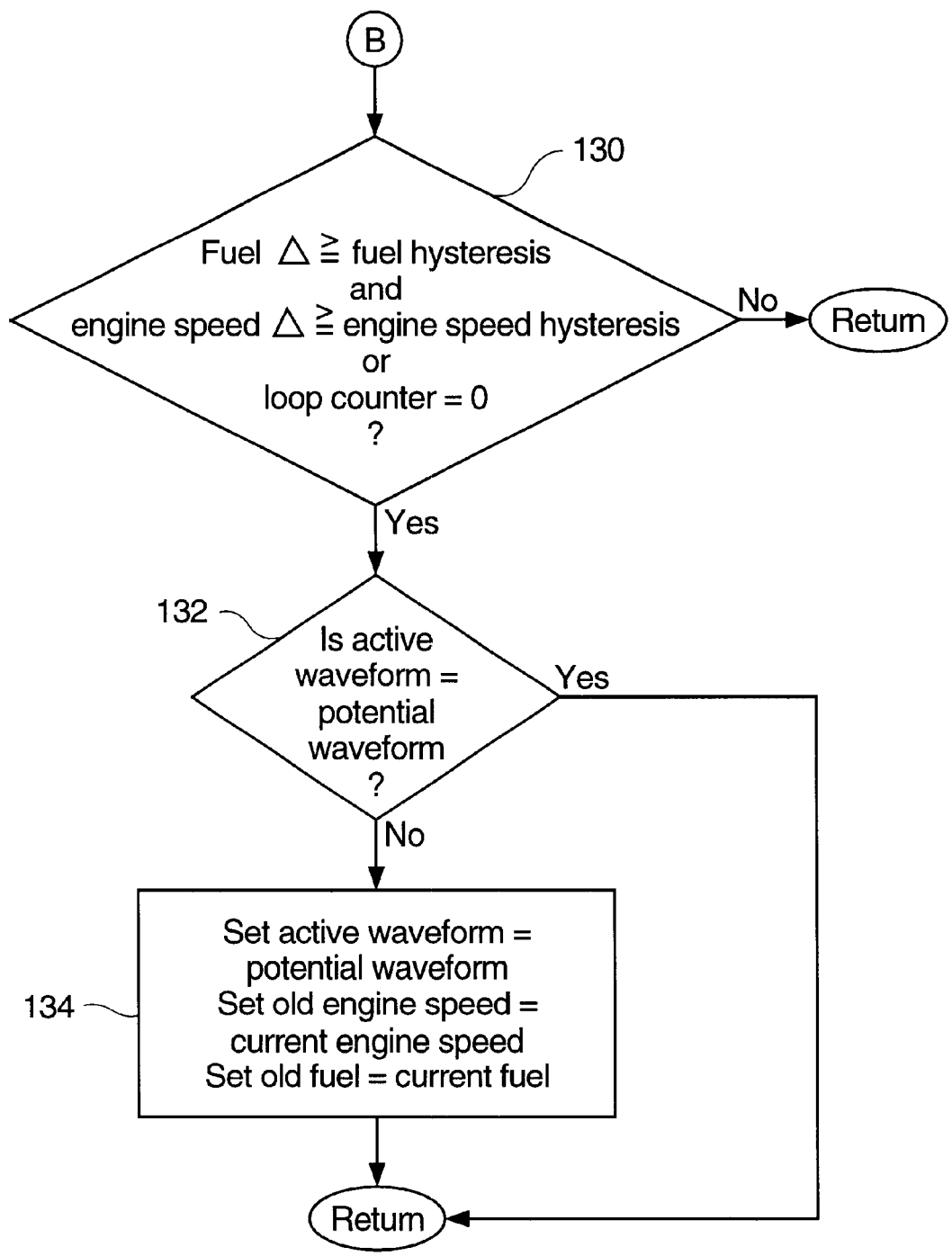

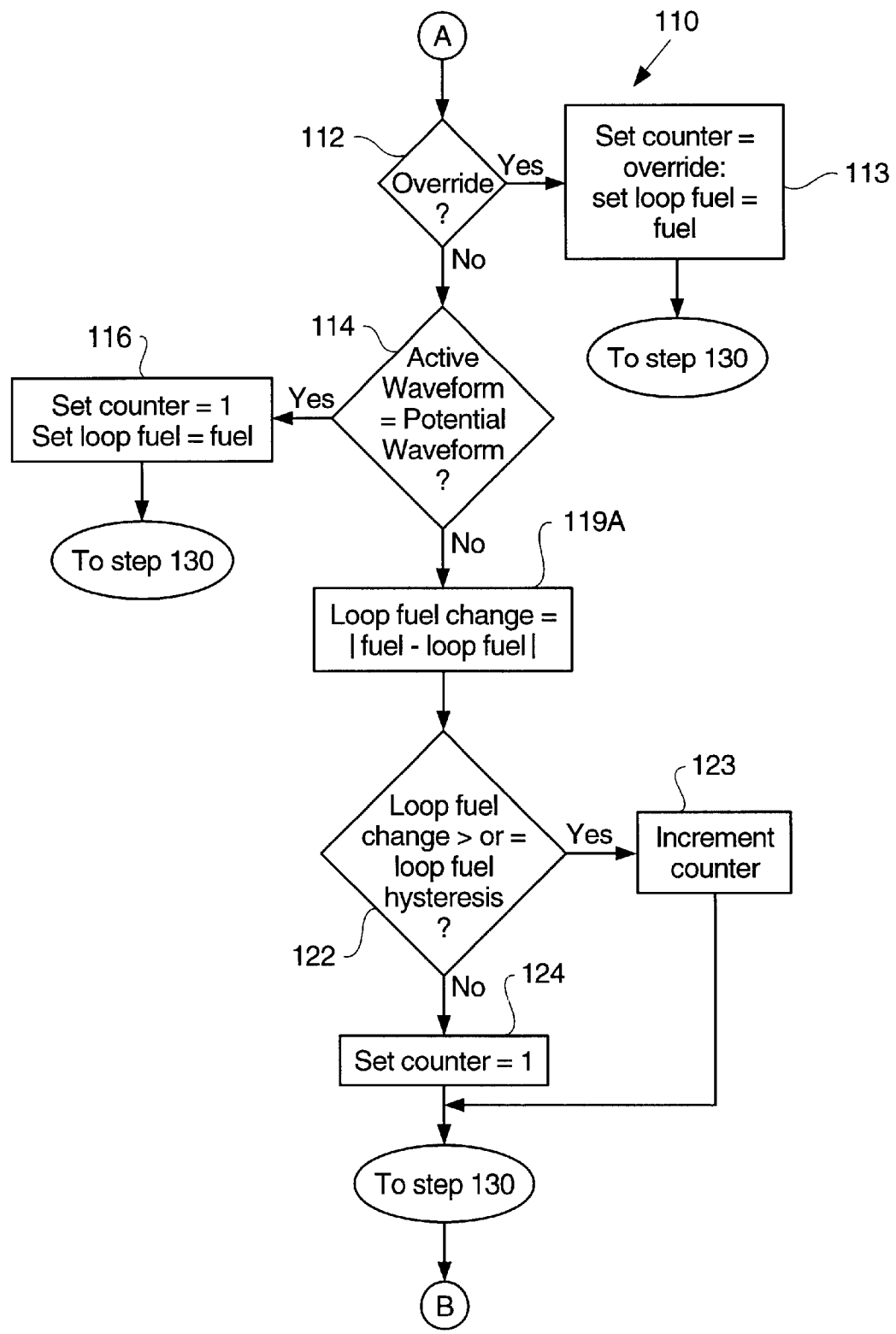
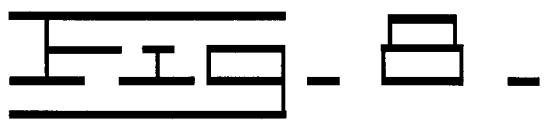

WAVEFORM TRANSITIONING METHOD AND APPARATUS FOR MULTI-SHOT FUEL SYSTEMS

TECHNICAL FIELD

This invention relates generally to electronically controlled fuel injection systems and, more particularly, to a method and apparatus for delivering multiple fuel injections to the cylinder of an internal combustion engine during a fuel injection event based upon engine operating conditions and determining when the fuel injector device should transition between injection waveforms providing different numbers of fuel injections during a particular injection event.

BACKGROUND ART

Electronically controlled fuel injectors are well known in the art including both hydraulically actuated electronically controlled fuel injectors as well as mechanically actuated electronically controlled fuel injectors. Electronically controlled fuel injectors typically inject fuel into a specific engine cylinder as a function of an injection signal received from an electronic controller. These signals include waveforms that are indicative of a desired injection rate including the number of injections in each injection event as well as the desired timing and quantity of fuel to be injected into the cylinders.

Emission regulations pertaining to engine exhaust emissions are increasingly becoming more restrictive throughout the world including, for example, restrictions on the emission of hydrocarbons, carbon monoxide, the release of particulates, and the release of nitrogen oxides ($NO_x$). Tailoring the number of injections and the injection rate of fuel to a combustion chamber, as well as the quantity and timing of such fuel injection is one way in which to control emissions and meet such emission standards. As a result, multi-shot injection techniques have been utilized to modify the burn characteristics of the combustion process in an attempt to reduce emission and noise levels. Multi-shot fuel injection typically involves splitting the total fuel delivery to the cylinder during a particular injection event into a plurality of separate fuel injection shots such as, for example, a pilot injection shot, a main injection shot, and an anchor injection shot. However, at different engine operating conditions, it may be necessary to use different injection strategies, that is, a different number of fuel shots, in order to achieve both desired engine operation and emissions control. As used throughout this disclosure, an injection event is defined as the injections that occur in a cylinder during one cycle of the engine. For example, one cycle of a four stroke engine for a particular cylinder, includes an intake, compression, expansion, and exhaust stroke. Therefore, the injection event in a four stroke engine includes the number of injections, or shots, that occur in a cylinder during the four strokes of the piston. The term shot as used in the art may also refer to the actual fuel injection or to the command current signal to a fuel injector or other fuel actuation device indicative of an injection or delivery of fuel to the engine.

As a result, based upon varying operating conditions, the number of fuel shots, injection timing, pressure and quantity of fuel may change in order to achieve desired emissions and desired fuel consumption. This means that different injection waveform types are preferrably used based upon engine speed and engine load. In some systems, the fuel injectors used have been somewhat limited as to the particular types of injection current waveforms which could be utilized. As a result, problems such as injecting fuel too rapidly within a given injection event and/or allowing fuel to be injected beyond a desired stopping point can adversely affect emission outputs and fuel economy.

In a system in which multiple injections and different injection waveforms are achievable, it has been determined that transfer from one type of waveform to another type of waveform must be better controlled under certain circumstances in order to prevent excessive noise and unnecessary repeated transition back and forth between two different waveform types causing decreased engine and emissions performance, and potentially unstable engine operation. It is therefore desirable to control and deliver any number of separate fuel injection shots to a particular cylinder during a particular injection event so as to minimize emissions and fuel consumption based upon the operating conditions of the engine and to provide a smoother, more controlled and stable transition between different waveform types.

Accordingly, the present invention is directed to overcoming one or more of the problems as set forth above.

DISCLOSURE OF THE INVENTION

In one aspect of the present invention, there is disclosed an electronically controlled fuel injection system which is capable of delivering multiple fuel injection shots to a particular cylinder of an internal combustion engine during a single injection event. The system includes at least one fuel injecting device operable to deliver a plurality of fuel injection shots, and a controller which is operable to determine the active injection waveform or number of fuel shots to be delivered during the injection events based upon engine operating conditions.

In a preferred embodiment, the controller is operable to determine a potential injection waveform based on a lookup table or map which selects the potential waveform based upon load and engine speed and engine load. The controller is also operable to set single check fuel hysteresis values and engine speed hysteresis values, and thereafter determine both a fuel change and an engine speed change. The controller then compares the fuel hysteresis values with the fuel change and the engine speed hysteresis values with the engine speed change. If the fuel change is greater than the fuel hysteresis values, and the engine speed change is also greater than the engine speed hysteresis values, the controller will change the active waveform to the potential waveform and store the current fuel and engine speed values. Alternatively, if the fuel change is consistently greater than a loop fuel hysteresis, which loop fuel hysteresis has a different band than the single check fuel hysteresis, for greater than a selected period of time, then the active waveform will be changed to the potential waveform. This is accomplished using a loop counter which is reset if the potential waveform equals the active waveform or the fuel change is less than loop fuel hysteresis values. Thus, the fuel change must be greater than the loop fuel hysteresis values continuously throughout the selected time period.

In another aspect of the present invention, a computer readable medium contains instructions for controlling the fuel injection control system to transition from one waveform to another waveform. The instructions determine if the fuel change and engine speed change are greater than the fuel hysteresis and the engine speed hysteresis, respectively. The instructions also repeatedly compare the fuel change to the loop fuel hysteresis values, and if the fuel change is consistently greater than or equal to the loop fuel hysteresis values for more than approximately 3.8 seconds, the active waveform is changed to the potential waveform.

In still another aspect of the present invention, a method is described for controlling a fuel injection control system to transition from one waveform to another. The method comprises setting single check fuel hysteresis values, loop fuel hysteresis values, and engine speed hysteresis values. A potential waveform is determined from a lookup table or map, and a single check fuel change, an engine speed change, and a loop fuel value change are determined by comparing current fuel and engine speed values with previous fuel and engine speed values. If both the single check fuel change and engine speed change are greater than the respective hysteresis values in a single check, the active waveform is changed to the potential waveform. Additionally or alternatively, if the loop fuel value change is greater than the loop fuel hysteresis values for a repeated number of comparisons, the active waveform is changed to the potential waveform.

BRIEF DESCRIPTION OF THE DRAWINGS

For a better understanding of the present invention, reference may be made to the accompanying drawings in which:

FIG. 2 is a schematic profile of a three shot fuel injection event waveform;

FIG. 3 is a schematic profile of three alternate fuel injection event waveforms having different numbers of fuel injections per injection event;

FIG. 4 is an exemplary, schematic representation of a lookup map for the desired waveform as a function of fuel and engine speed;

FIG. 7 is a continuation of FIG. 6 and is a schematic block diagram illustrating the remaining operational steps which trigger a waveform change in accordance with the teachings of the present invention; and FIG. 8 is a schematic block diagram illustrating an alternate embodiment of a portion of the block diagram of FIG. 6.

BEST MODE FOR CARRYING OUT THE INVENTION

Figure 1:
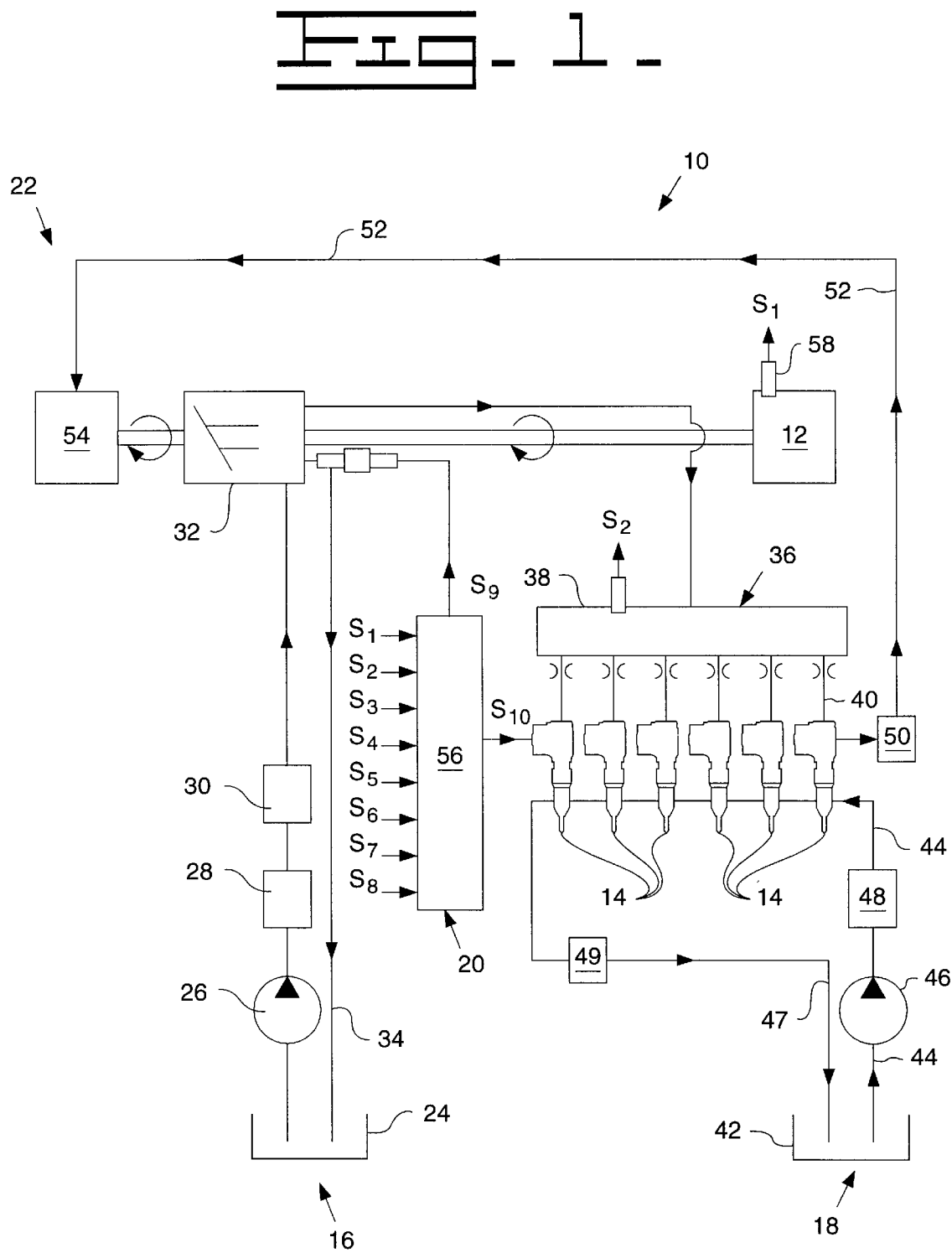
FIG. 1 is a typical schematic view of an electronically controlled injector fuel system used in connection with one embodiment of the present invention.

Referring to FIG. 1, there is shown one embodiment of a hydraulically actuated electronically controlled fuel injection system 10 in an exemplary configuration as adapted for a direct-injection compression ignition engine 12. Fuel system 10 includes one or more electronically controlled fuel injection devices, such at fuel injector 14, which are adapted to be positioned in a respective cylinder head bore of the engine 12. While the embodiment of FIG. 1 applies to an in-line six cylinder engine, it is recognized and anticipated, and it is to be understood, that the present invention is also equally applicable to other types of engines such as V-type engines and rotary engines, and that the engine may contain any plurality of cylinders or combustion chambers. In addition, while the embodiment of FIG. 1 also illustrates a hydraulically actuated electronically controlled fuel injector system, it is likewise recognized and anticipated that the present invention is also equally applicable to other types of fuel injection devices including, electronically controlled injectors, mechanically actuated electronically controlled injector units as well as fluid activated common rail type fuel injection systems with digitally controlled fuel valves.

The fuel system 10 of FIG. 1 includes an apparatus or means 16 for supplying actuation fluid to each injector 14, an apparatus or means 18 for supplying fuel to each injector, electronic control means 20 for controlling the fuel injection system including the manner and frequency in which fuel is injected by the injectors 14 including timing, number of injections per injection event, fuel quantity per injection, time delay between each injection, and the injection profile. The system may also include apparatus or means 22 for recirculating fluid and/or recovering hydraulic energy from the actuation fluid leaving each injector 14.

The actuating fluid supply means 16 preferably includes an actuating fluid sump or reservoir 24, a relatively low pressure actuating fluid transfer pump 26, an actuating fluid cooler 28, one or more actuation fluid filters 30, a high pressure pump 32 for generating relatively high pressure in the actuation fluid, and at least one relatively high pressure actuation fluid manifold or rail 36. A common rail passage 38 is arranged in fluid communication with the outlet from the relatively high pressure actuation fluid pump 32. A rail branch passage 40 connects the actuation fluid inlet of each injector 14 to the high pressure common rail passage 38. In the case of a mechanically actuated electronically controlled injector, manifold 36, common rail passage 38 and branch passages 40 would typically be replaced with some type of cam actuating arrangement or other mechanical means for actuating such injectors. Examples of a mechanically actuated electronically controlled fuel injector unit are disclosed in U.S. Pat. Nos. 5,947,380 and 5,407,131. In the preferred embodiment, the injection device is a fuel injector, but may be a digitally controlled fuel valve associated with a common rail fuel system.

Apparatus 22 may include a waste accumulating fluid control valve 50 for each injector, a common recirculation line 52, and a hydraulic motor 54 connected between the actuating fluid pump 32 and recirculation line 52. Actuation fluid leaving an actuation fluid drain of each injector 14 would enter the recirculation line 52 that carries such fluid to the hydraulic energy recirculating or recovering means 22. A portion of the recirculated actuation fluid is channeled to high-pressure actuation fluid pump 32 and another portion is returned to actuation fluid sump 24 via recirculation line 34.

In a preferred embodiment, the actuation fluid is engine lubricating oil and the actuating fluid sump 24 is an engine lubrication oil sump. This allows the fuel injection system to be connected as a parasitic subsystem to the engine's lubricating oil circulation system. Alternatively, the actuating fluid could be fuel.

The fuel supply means 18 preferably includes a fuel tank 42, a fuel supply passage 44 arranged in fluid communication between the fuel tank 42 and the fuel inlet of each injector 14, a relatively low pressure fuel transfer pump 46, one or more fuel filters 48, a fuel supply regulating valve 49, and a fuel circulation and return passage 47 arranged in fluid communication between each injector 14 and fuel tank 42.

Electronic control means 20 preferably includes a controller, specifically an electronic control module (ECM)

56, the general use of which is well known in the art. ECM 56 typically includes processing means such as a microcontroller or microprocessor, a governor such as a proportional integral derivative (PID) controller for regulating engine speed, and circuitry including input/output circuitry, power supply circuitry, signal conditioning circuitry, solenoid driver circuitry, analog circuits and/or programmed logic arrays as well as associated memory. The memory is connected to the microcontroller or microprocessor and stores instruction sets, maps, lookup tables, variables, and more. ECM 56 may be used to control many aspects of fuel injection including (1) the fuel injection timing, (2) the total fuel injection quantity during an injection event, (3) the fuel injection pressure, (4) the number of separate injections or fuel shots during each injection event, (5) the time intervals between the separate injections or fuel shots, (6) the time duration of each injection or fuel shot, (7) the fuel quantity associated with each injection or fuel shot, (8) the actuation fluid pressure, (9) current level of the injector waveform, and (10) any combination of the above parameters. Each of such parameters are variably controllable independent of engine speed and load. ECM 56 receives a plurality of sensor input signals $S_1$–$S_8$ which correspond to known sensor inputs such as engine operating conditions including engine speed, engine temperature, pressure of the actuation fluid, cylinder piston position and so forth that are used to determine the precise combination of injection parameters for a subsequent injection event.

For example, an engine temperature sensor 58 is illustrated in FIG. 1 connected to engine 12. In one embodiment, the engine temperature sensor includes an engine oil temperature sensor. However, an engine coolant temperature sensor can also be used to detect the engine temperature. The engine temperature sensor 58 produces a signal designated by $S_1$ in FIG. 1 and is inputted to ECM 56 over line $S_1$. In the particular example illustrated in FIG. 1, ECM 56 issues control signal $S_9$ to control the actuation fluid pressure from pump 32 and a fuel injection signal $S_{10}$ to energize a solenoid or other electrical actuating device within each fuel injector thereby controlling fuel control valves within each injector 14 and causing fuel to be injected into each corresponding engine cylinder. Each of the injection parameters are variably controllable, independent of engine speed and load. In the case of the fuel injectors 14, control signal $S_{10}$ is a fuel injection signal that is an ECM commanded current to the injector solenoid or other electrical actuator.

It is recognized that the type of fuel injection desired during any particular fuel injection event will typically vary depending upon various engine operating conditions. In an effort to achieve desired emission and fuel consumption amounts, it has been found that delivering multiple (two or more) separate fuel injections to a particular cylinder during a fuel injection event at varying engine operating conditions achieves both desired engine operation as well as emissions control. FIG. 2 illustrates a multiple injection including three separate fuel injections, namely, a first fuel injection or pilot shot 60, a second fuel injection or main shot 62, and a third fuel injection or anchor shot 64. As illustrated in FIG. 2, the pilot shot 60 is injected into the combustion chamber in advance of the main shot 62 by some determined time factor, crank angle or main delay 61, and the anchor shot is sequenced after the main shot 62 based upon a determined time factor, crank angle or anchor delay 63. Based upon programming associated with electronic controller 56 as well as a variety of different maps and/or lookup tables stored within the memory of controller 56 including maps and/or tables relating to engine speed, engine load, the pressure associated with rail passage 38 (rail pressure), desired total fuel quantity and other parameters, controller 56 will be able to dynamically determine the appropriate number of fuel shots per injection event, the quantity of fuel desired for each fuel shot 60, 62 and 64 and partition the same accordingly, and it will be able to determine the desired timing and duration of each individual shot. In the three shot multiple injection depicted in FIG. 2, a portion of the total fuel to be delivered to the engine cylinder will be injected by the pilot shot 60, a portion of such total fuel will be injected by the main shot 62, and a remaining portion of the total fuel to be injected will be injected by the anchor shot 64. A three fuel multiple injection with the ability to transition in a stable manner to fewer shots has advantages in terms of exhaust emissions, including reduced particulate emissions and/or reduced $NO_x$ emissions as well as desired engine performance at many engine operating conditions as will be hereinafter further explained.

As discussed, the desired fuel injection signal may change based on varying engine conditions, such as engine speed and engine load. In the preferred embodiment, a map or lookup table may be used to determine the desired fuel injection signal based upon engine speed and engine load. In one embodiment, the total desired fuel quantity requested by the governor may be used as an indicator of load. In an alternative embodiment, engine temperature and power settings may be used in conjunction with the total desired fuel quantity to indicate the load of the engine. Alternatively, the desired torque of the engine may be used as an indicator of load. Referring to FIGS. 2 and 3, using request fuel as an indicator of load, as the engine speed changes and as the amount of fuel or load changes, the desired fuel quantity, fuel allocation among fuel shots, and the desired number of fuel shots may change. Thus, in a preferred embodiment, with three possible fuel shots and the main shot being required, there are four possible waveforms represented by the integers zero (0) (FIG. 3), one (1) (FIG. 3), two (2) (FIG. 3), and three (3) (FIG. 2). The first waveform shown in FIG. 2 includes all three shots and is represented by the integer 3. The other possible waveforms include various combinations and omissions of the three shots. In the top line of FIG. 3, the waveform 0 has only the main shot 62. The bottom line illustrates a waveform 1 having the pilot 60 and main shot 62, and the middle line illustrates a waveform 2 having the main shot 62 and the anchor shot 64. The controller is operable to change the waveform according to the program illustrated in FIGS. 5, 6, and 7. The program is preferably stored on a computer readable medium such as the memory provided by the ECM/controller 56. Further, the controller is operable to generate control and injection signals $S_{10}$ for transmission through a computer readable data transmission medium, which can be placed in communication with a diagnostic and design apparatus (not shown) including a display and keypad.

In another embodiment, a fourth shot may be injected to improve combustion and emissions in certain operating conditions. The fourth shot is termed a post shot and follows the anchor shot. If there is no anchor shot, the post follows the main shot. The addition of the fourth shot increases the potential number of waveform combinations to eight. Generally, the post shot is preferably made as late as possible after top dead center. Therefore, the number of possible waveforms increases as the number of shots increases, and may be accounted for accordingly.

Referring additionally to FIG. 4, during engine operation, the desired injection waveform and corresponding number of fuel shots per injection event changes as the engine speed and load. As mentioned, a change in total desired fuel quantity requested by the governor may be used as an indicator of change in load. In the exemplary lookup table or map 100 of FIG. 4, waveform 2, having main and anchor shots, is desired for any engine speed when fuel or load is less than approximately ¼ of rated engine load. When the fuel or engine load is above ¼ of rated engine load and the engine speed is in range A, waveform 1, having pilot and main shots, is desired. In engine speed range B, waveform 2 is desired. In engine speed range C, waveform 3 is desired having all three shots. In range D, the desired waveform goes back to waveform 2, and for engine speeds higher than range D, waveform 0 is desired having only the main shot 62. However, it is not desirable for the waveform to change every time the engine speed and fuel move to a different waveform area of the lookup table or map. Permitting the waveform to change freely based upon the lookup table or map can lead to changing the waveform back and forth too frequently, particularly if the operating conditions of the engine border two different waveform regions and such conditions fluctuate back and forth between the two different regions. Therefore, to achieve desired waveform stability, sufficient changes in engine speed and/or load/fuel amount as set by the governor are confirmed before the waveform is permitted to transition.

Figure 5:
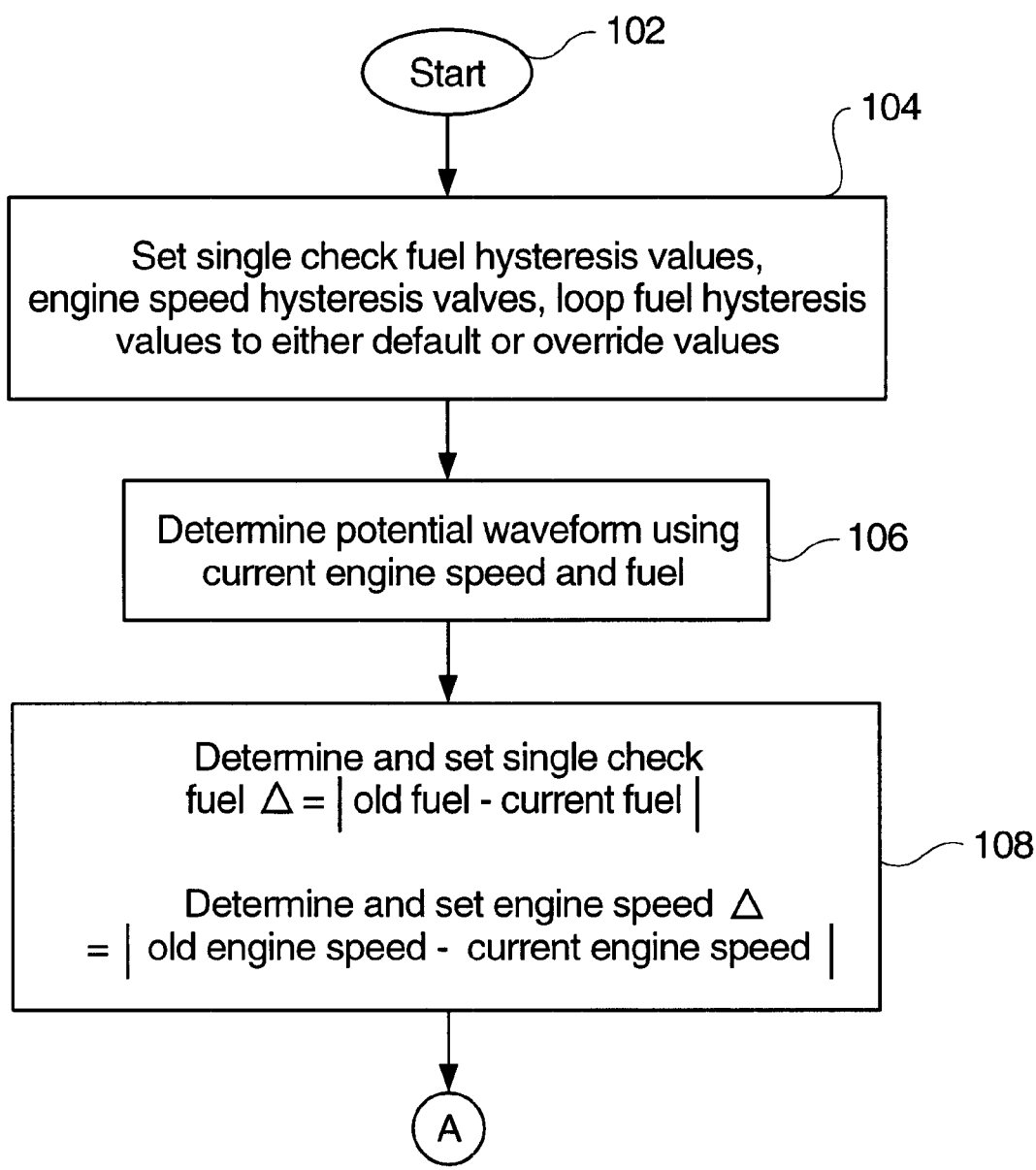
FIG. 5 is a schematic block diagram illustrating a portion of the operational steps allowing the transition from one waveform to another waveform.
Figure 6:
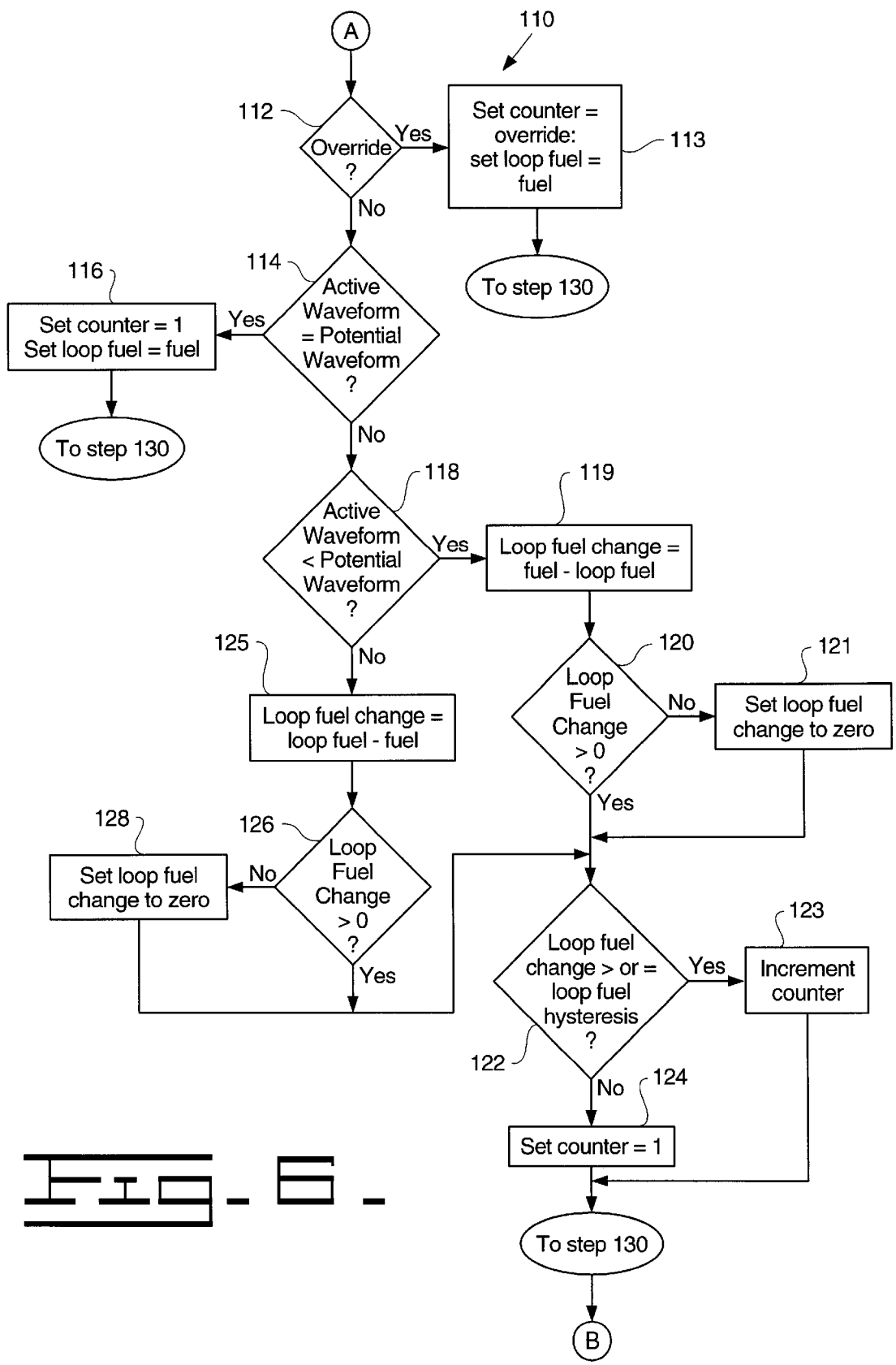
FIG. 6 is a continuation of FIG. 5 and is a schematic block diagram illustrating the operational steps of the loop counter function of the present invention.

Referring to FIGS. 5, 6, and 7, the multiple fuel injection waveform selection program start and return location is identified at 102 and leads into a selection step 104 for engine speed hysteresis values and two sets of fuel hysteresis values. A hysteresis is a band, which, if desired, can be illustrated graphically, representing a range of values for operational amounts of fuel or load and operational engine speed values. For example, for an operational engine speed of 2200 rpm, the engine speed hysteresis value might be 25 rpm. That is, as the engine transitions into given ranges, the change needs to exceed a threshold for that range. The hysteresis values are used as described below to determine when, using the example, engine speed has changed by more than the hysteresis value (e.g. 25 rpm) corresponding to the given operational engine speed. That is, the program detects an engine speed change from 2200 rpm to greater than 2225 rpm or less than 2175 rpm.

The two sets of fuel hysteresis values include single check fuel hysteresis values and loop fuel hysteresis values. The single check fuel hysteresis is referred to as such because only one comparison check may result in a waveform transition where many comparisons are made with the loop hysteresis. The single check fuel hysteresis values are preferably used in combination with the engine speed hysteresis values, and the loop fuel hysteresis values are preferably used in a loop counter as described below. Because the single check fuel hysteresis values are used in combination with the engine speed hysteresis values and the loop fuel hysteresis values are used separately, the single check fuel hysteresis is preferably a narrow band hysteresis while the loop fuel hysteresis is preferably a relatively wide band hysteresis. That is, the loop fuel hysteresis value for a specific operational fuel amount will be greater than the single check fuel hysteresis value for that same fuel amount. Preferably, the loop fuel hysteresis values should be at least as great as the single check fuel hysteresis values.

At step 104, the hysteresis values can be set by the controller to predetermined default values, to override values, or to dynamically determine values. Dynamically determined values may be determined and updated dynamically during operation of the engine. The overrides are used as design tools by cell developers to isolate conditions and limit variables in cylinders. The overrides are not intended for use in normal operation of an engine. If there are no overrides desired, the hysteresis values are set to the defaults.

At step 106, the controller determines a potential waveform based on current fuel requested by the governor, e.g., total desired fuel quantity, and engine speed as detected by sensors. Preferably, the potential waveform is determined by looking up the potential waveform on a lookup table or map such as FIG. 4. At step 108, the controller determines a single check fuel change and a single check engine speed change. The fuel change is set to the absolute value of a difference of the previous fuel less the current fuel, and the engine speed change is set to the absolute value of a difference of the previous engine speed less the current engine speed. These changes are determined by comparing the current engine speed and total desired fuel quantity with the engine speed and fuel quantity previously stored or recorded when the injection waveform was last changed. The previous fuel and engine speed are set each time there is a waveform transition.

Referring to FIG. 6, flowchart portion 110 illustrates the loop counter function of the present invention, which utilizes the loop fuel hysteresis values. Steps within the loop counter 110 will be numbered and generally designated by arrows on the drawing. First, the loop counter checks for an override 112 to which the counter would be set at step 113. If there is no override, the potential waveform is compared to the currently active waveform at step 114. If the potential waveform is the same as the active waveform, the loop counter is reset back to one (1) at step 116, and a loop previous fuel amount is set to the current fuel amount at step 116. Thus, the loop previous fuel is always the fuel at the last time the potential waveform equaled the active waveform. The program would then move to a waveform transition decision step 130.

If the potential waveform is not equal to the active waveform, step 116 is skipped and the waveforms are compared again at step 118 to determine which is greater. A determination as to which waveform is greater is based upon the integer number or representation assigned to the various waveforms as shown in FIGS. 2–4. In other words, waveform 2 is greater than waveforms 1 and 0 and waveform 2 is less than waveform 3. If the potential waveform is greater than the active waveform, then generally, more fuel is required for the potential waveform as compared to the active waveform. This is due to the number of fuel shots associated with each waveform as well as the fuel allocation associated with each shot. Because more fuel is required, the program instructions confirm that there is indeed more fuel available for such a transition by subtracting the loop previous fuel from the current fuel at step 119, and if the difference is positive at step 120, the loop fuel change is set to the difference. Alternatively, if the difference at step 120 is negative, the loop fuel change is set to zero at step 121. Here again, the loop fuel change is determined by comparing the current fuel with the previously stored loop fuel value set at step 116. Then the loop fuel change is compared to the loop fuel hysteresis values at step 122, and if the loop fuel change is greater than or equal to the loop fuel hysteresis values, the counter is incremented by one (1) at step 123. If the loop fuel change is less than the loop fuel hysteresis values, which will necessarily be the case if the loop fuel change is zero, the counter is reset to one (1) at step 124. The program would then move to the waveform transition decision step 130.

When the counter is incremented a selected number of times corresponding to a selected period of time, e.g., 255 times, it rolls over to zero (0) automatically, and when the counter hits zero, the active waveform is changed to the potential waveform as described below. Thus, before the program will change to a greater active waveform on the sole basis of a change in fuel, the program confirms that there is, and has been, for 255 consecutive checks or some other predetermined number of checks, more fuel available for the waveform transition to a greater waveform. The program runs through the loop once approximately every 15 milliseconds based on speed of the controller. Thus, the required change in fuel must be continuously present for a selected period of time, e.g., 3.8 seconds, for the active waveform to change to the potential waveform. It is recognized that other time factors and other parameters may be selected depending upon the particular operating conditions of the engine.

If the comparison of the potential waveform and the active waveform at step 118 reveals that the potential waveform is less than the active waveform, then generally, less fuel is required for the potential waveform as compared to the active waveform. Because less fuel is required, the program instructions confirm that there is indeed less fuel available for such a transition by subtracting the current fuel from the loop previous fuel at step 125, and if the difference is positive at step 126, the loop fuel change is set to the difference. Alternatively, if the difference at step 126 is negative, the loop fuel change is set to zero at step 128. Then, as previously discussed, the loop fuel change is compared to the loop fuel hysteresis values at step 122, and if the loop fuel change is greater than or equal to the loop fuel hysteresis values, the counter is incremented by one (1) at step 123. If the loop fuel change is less than the loop fuel hysteresis values, which will necessarily be the case if the loop fuel change is zero, the counter is reset to one (1) at step 124. The program would then move to the waveform transition decision step 130.

Again, when the counter is incremented above a threshold, e.g. 255 times or some other predetermined number of comparisons, it automatically turns over to zero (0), and when the counter hits zero, the active waveform is changed to the potential waveform as described below. Thus, before the program will change to a lesser active waveform on the sole basis of a change in fuel, the program confirms that there is, and has been, for 255 consecutive checks, less fuel available for the waveform transition to a lesser waveform.

In an alternate embodiment illustrated in FIG. 8, the program compares the active waveform to the potential waveform and determines if they are equal in step 114 as before. However, in the event that the waveforms are not equal, the program does not determine which is greater. If the waveforms are not equal, the program sets loop fuel change equal to the absolute value of the fuel less the loop fuel at step 119A and proceeds to step 122 as before.

At the waveform transition decision step 130, the single check fuel change determined at step 108 is compared with the single check fuel hysteresis and the engine speed change determined at stop 108 is compared with the engine speed hysteresis. If, in any single run through the program, both the single check fuel change is greater than or equal to the single check fuel hysteresis values and the engine speed change is greater than or equal to the engine speed hysteresis values, the program will compare the potential and active waveforms at step 132. If additionally or alternatively at step 130, the loop counter is zero (0), the program will also compare the potential and active waveforms at step 132. If the potential and active waveforms are equal, the program returns to the point in the software that was the calling function without setting the fuel and engine speed. If the potential and active waveforms are not equal, the active waveform is changed to the potential or now desired waveform at step 134. Additionally at step 134, the previous engine speed is set to the current engine speed at that time, and the previous fuel is set to the current fuel at that time. The program then returns to the start location 102. This program has the affect of forcing engine conditions slightly beyond the conditions necessary for a waveform transition, and thus, the controller provides increased stability in waveform transitions.

Industrial Applicability

Utilization of an injection method and system in accordance with the present invention provides for better emission control during certain engine operating conditions as explained above. Although the particular injection waveform for delivering multiple fuel injections may vary depending upon the particular engine operating conditions, the present system is capable of dynamically determining the timing associated with each individual injection event, the injection duration, injection quantity, any delays between injections, the number of injections in each injection event, and the displacement of the cylinder piston relative to the beginning of each injection event regardless of the type of electronically controlled fuel injectors or digitally controlled valves or common rail fuel system being utilized, regardless of the type of engine being utilized, and regardless of the type of fuel being utilized. In this regard, appropriate fuel maps relating rail pressure, engine speed, fuel, engine load, pilot/main/anchor duration times, injection waveforms, pilot/main/anchor fuel quantities, anchor timing delay, and other parameters can be stored or otherwise programmed into ECM 56 for use during all operating conditions of the engine. These operational maps, tables and/or mathematical equations stored in the ECM programmable memory determine and control the various parameters, including waveforms, associated with the appropriate multiple injection events to achieve desired emissions control.

Operation of the fuel system 10 as described above with respect to the flow chart illustrated in FIGS. 5–7 provides an improved and controlled transitioning from one waveform type to another waveform type. Use of a waveform map, such as the exemplary waveform map 100 illustrated in FIG. 4, to select an injection waveform type is therefore better controlled based upon a determination of whether certain engine speed and/or fuel quantity changes have occurred over time in comparison with predetermined engine speed and fuel hysteresis values. Operation of the fuel system 10 as described above also provides for a smooth transitioning from use of one waveform type to another waveform type because repeated transfer back and forth between two different injection waveform types is prevented, particularly when the engine is operating at engine conditions which border between two different waveform regions such as between waveform regions 2 and 3 illustrated in table 100 of FIG. 4. This transitioning method also helps to reduce noise levels typically experienced during transfer from one type of injection waveform to another type of injection waveform and this improved transitioning method also saves wear and tear on the engine.

It is also recognized that the flow chart illustrated in FIGS. 5–7 is merely representative of one manner of organizing the operational steps of the present invention and that other variations and modifications could be utilized without departing from the spirit and scope of the present invention.

Further, although the discussion herein has referred generally to different types of injection waveforms, it is recognized that the present invention is applicable with respect to split injection waveforms, square injection waveforms, ramped injection waveforms, and other injection waveform types now in existence including waveform types which could be hereinafter developed. The present invention is therefore generally applicable to the transfer between any two different waveform types, regardless of the specific waveform shape.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the sprit and scope of the present invention.

Other aspects, objects and advantages of the present invention can be obtained from a study of the drawings, the disclosure and the appended claims.

What is claimed is:

1. A fuel injection control system for controlling the transition from an active fuel injection waveform to another fuel injection waveform in an electrically controlled multiple shot fuel injection system comprising:
   at least one fuel injection device operable to deliver a plurality of fuel injection shots;
   an electronic controller coupled to the at least one fuel injection device;
   the controller being operable to determine a potential waveform based upon current engine operating conditions;
   the controller being operable to set loop fuel hysteresis values;
   the controller being operable to determine a loop fuel change;
   the controller being operable to compare the loop fuel hysteresis values with the loop fuel change; and
   the controller being operable to change the active waveform to the potential waveform if the loop fuel change is greater than the loop fuel hysteresis values for longer than a selected period of time.

2. The fuel injection control system according to claim 1 wherein the selected period of time is approximately four seconds.

3. The fuel injection control system according to claim 1 wherein if the loop fuel change is constantly greater than the fuel hysteresis values for longer than the selected period of time, the controller is operable to change the active waveform to the potential waveform.

4. The fuel injection control system according to claim 1 wherein the selected period of time includes a selected number of comparisons between the loop fuel hysteresis values and loop fuel change.

5. The fuel injection control system according to claim 1 further comprising the controller being operable to compare the active waveform with the potential waveform, and if the active waveform is less than the potential waveform, set the loop fuel change to a difference of a current fuel value less a previous fuel value, and if the difference is negative, set the loop fuel change to zero; and if the loop fuel change is greater than the loop fuel hysteresis values, increment a counter by one.

6. The fuel injection control system according to claim 5 wherein if the active waveform is greater than the potential waveform, set the loop fuel change to a difference of a previous fuel value less a current fuel value, and if the difference is negative, set the loop fuel change to zero; and if the loop fuel change is greater than the loop fuel hysteresis values, increment a counter by one.

7. The fuel injection control system according to claim 1 further comprising the controller being operable to set engine speed hysteresis values, determine an engine speed change, and compare the engine speed hysteresis values with the engine speed change.

8. The fuel injection control system according to claim 7 further comprising the controller being operable to set single check fuel hysteresis values, determine a single check fuel change, and compare the single check fuel change to the single check fuel hysteresis values.

9. The fuel injection control system according to claim 8 wherein if the single check fuel change is greater than the single check fuel hysteresis values and the engine speed change is greater than the engine speed hysteresis values, the controller is operable to change the active waveform to the potential waveform.

10. A fuel injection control system for controlling the transition from an active fuel injection waveform to another fuel injection waveform in a multiple shot fuel injection system comprising:
    at least one fuel injection device operable to deliver a plurality of fuel injection shots;
    an electronic controller coupled to the at least one fuel injection device;
    the controller being operable to determine a potential waveform based upon current engine speed and current fuel quantity;
    the controller being operable to set fuel hysteresis values and engine speed hysteresis values;
    the controller being operable to determine a fuel change and an engine speed change based upon a comparison between current fuel and engine speed conditions and previously stored fuel and engine speed conditions;
    the controller being operable to compare the fuel hysteresis values with the fuel change and the engine speed hysteresis values with the engine speed change; and
    the controller being operable to change the active waveform to the potential waveform if the fuel change is greater than the fuel hysteresis values and the engine speed change is greater than the engine speed hysteresis values.

11. The fuel injection control system according to claim 10 further comprising the controller being operable to set loop fuel hysteresis values, determine a loop fuel change and repeatedly compare the loop fuel change to the loop fuel hysteresis values, and if the loop fuel change is greater than the loop fuel hysteresis values for more than a selected number of comparisons, the controller being operable to change the active waveform to the potential waveform.

12. The fuel injection control system according to claim 11 wherein the selected number of comparisons is approximately 255.

13. The fuel injection control system according to claim 11 wherein the loop fuel hysteresis values are greater than the fuel hysteresis values.

14. The fuel injection control system according to claim 10 wherein the controller is operable to change the active waveform to the potential waveform if the fuel change is greater than the fuel hysteresis values and the engine speed change is greater than the engine speed hysteresis values in a single check.

15. A computer readable medium containing instructions for controlling a fuel injection control system to transition an active fuel injection waveform to another fuel injection waveform in a multiple shot fuel injection system comprising:

setting single check fuel hysteresis values, loop fuel hysteresis values, and engine speed hysteresis values;

determining a potential waveform based upon current engine operating conditions;

determining a single check fuel change, an engine speed change, and a loop fuel change; and if the single check fuel change is greater than or equal to the single check fuel hysteresis values and the engine speed change is greater than or equal to the engine speed hysteresis values, and additionally or alternatively, if the loop fuel change is greater than or equal to the loop fuel hysteresis value for more than a selected number of comparisons, changing the active waveform to the potential waveform.

16. The computer readable medium according to claim 15 wherein determining the potential waveform comprises looking up the potential waveform in a waveform map based upon engine speed and engine load.

17. The computer readable medium according to claim 15 further comprising setting a loop counter to one if the active waveform equals the potential waveform, and additionally or alternatively, if the loop fuel change is less than the loop fuel hysteresis values.

18. A method for controlling a fuel injection control system to transition an active fuel injection waveform to another fuel injection waveform in a multiple shot fuel injection system comprising the steps of:

setting single check fuel hysteresis values and engine speed hysteresis values;

determining a potential waveform based upon current engine operating conditions;

determining a single check fuel change and an engine speed change;

comparing the single check fuel change to the single check fuel hysteresis values;

comparing the engine speed change to the engine speed hysteresis values; and changing the active waveform to the potential waveform if the single check fuel change is greater than the single check fuel hysteresis values and the engine speed change is greater than the engine speed hysteresis values.

19. The method according to claim 18 further comprising the steps of:

setting loop fuel hysteresis values;

determining a loop fuel change;

comparing the active waveform to the potential waveform; and setting the loop fuel change to a difference of previous fuel less current fuel if the active waveform is greater than the potential waveform and the difference of the previous fuel less current fuel is positive, and alternatively setting the loop fuel change to a difference of current fuel less previous fuel if the active waveform is less than the potential waveform and the difference of current fuel less previous fuel is positive.

20. The method according to claim 19 further comprising incrementing a loop counter by one.

21. The method according to claim 19 further comprising the steps of:

comparing the loop fuel change to the loop fuel hysteresis values and if the loop fuel change is greater than the loop fuel hysteresis values for more than a selected number of comparisons, changing the active waveform to the potential waveform.

22. A method for controlling a fuel injection control system to transition an active fuel injection waveform to another fuel injection waveform in a multiple shot fuel injection system comprising the steps of:

setting loop fuel hysteresis values;

determining a waveform based upon current engine operating conditions;

determining a loop fuel change;

comparing the loop fuel change to the loop fuel hysteresis values; and changing the active waveform to the potential waveform if the loop fuel change is greater than the loop fuel hysteresis values for longer than a selected period of time.

23. The method according to claim 22 wherein the selected period of time includes a selected number of comparisons between the loop fuel hysteresis values and loop fuel change.

24. The method according to claim 22 wherein the selected period of time is approximately four (4) seconds.

* * * * *